June 28, 1938. T. F. BAILY 2,121,776
METHOD OF CALCINING PHOSPHATE BEARING MATERIALS
Filed March 18, 1935
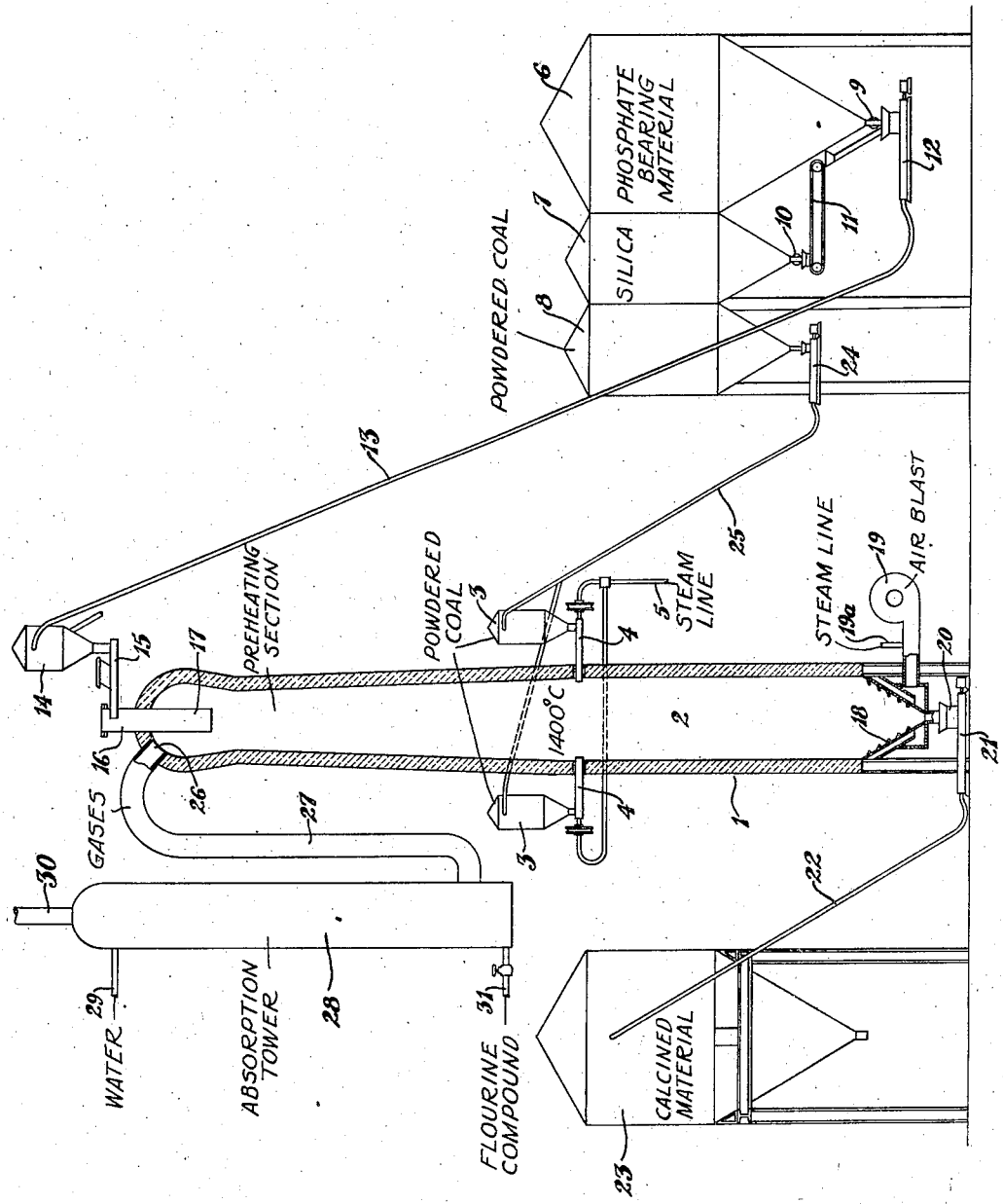
Inventor
T. F. Baily
By Frease and Bishop
Attorneys Patented June 28, 1938

2,121,776

UNITED STATES PATENT OFFICE 2,121,776

METHOD OF CALCINING PHOSPHATE-BEARING MATERIALS

Thaddeus F. Baily, Canton, Ohio

Application March 18, 1935, Serial No. 11,673

10 Claims. (Cl. 71—47)

The invention relates to a method and apparatus for the treatment of phosphate-bearing materials such as natural phosphates containing fluorine to eliminate the fluorine from the phosphate-bearing materials, and to render the phosphate citrate soluble.

Practically all phosphate-bearing materials such as phosphate rocks, phosphorites, and apatites, whether found in the United States or in other countries, contain fluorine, a substantial part of which is held in chemical combination with the calcium phosphate, usually as fluorapatite, $3Ca_3(PO_4)_2.CaF_2$, the balance being thought to exist in the form of calcium fluoride, $CaF_2$, or some other compound of fluorine. In most phosphate rock formations, of commercial importance, substantially all of the calcium phosphate occurs in the form of fluorapatite, but the total amount of fluorine contained in the rock is usually in excess of that which can be accounted for as fluorapatite. A part of the balance at least is in the form of calcium fluoride and for the purpose of this invention it has been found practical to consider that the entire balance is present as $CaF_2$. The $P_2O_5$ in fluorapatite is citrate soluble to a limited extent which limits its usefulness as a fertilizer when applied directly to the soil. If the insoluble $P_2O_5$ is converted to the citrate soluble form it then becomes a very desirable and efficient fertilizer material.

It is also known that the $P_2O_5$ and calcium of mineral phosphates are readily assimilated by domestic animals and fowl and that calcium and phosphorous deficiencies in the diet of animals and fowl may be supplied cheaply and efficiently by mineral phosphates. There is a serious objection to the continued use of the natural phosphates for this purpose for the reason that it is thought fluorine acts as a cumulative poison and as has already been pointed out, practically all mineral phosphates contain fluorine. It has been found that the $P_2O_5$ in mineral phosphates such as Florida pebble phosphate, Tennessee brown phosphate rock, apatite and the like can be efficiently converted to the citrate soluble form by heating the rock under controlled conditions. It has also been found that by so treating the rock substantially all of the fluorine is volatilized and removed.

I am aware that others have removed fluorine from phosphate rock by treating the raw material with heat and reagents in a rotary kiln or reverberatory furnace, but the efficiency of such operations is low on account of incomplete exposure of the mineral particles to the reaction gases; moreover, there is a tendency for the material to sinter or melt to a sufficient extent to cause ringing up in the high temperature zone of the kiln.

These disadvantages are overcome by my furnace and method for treating such materials wherein the materials of the charge in the form of particles are fed in at the top of a vertical furnace and allowed to fall freely down the shaft of such furnace in counterflow to the upcoming heating and reaction gases as exemplified in my co-pending application Serial No. 730,382, filed June 13, 1934. In my present process, the particles of charged material are caused to come in intimate contact with the furnace gases which move in counterflow to the free-falling charge, thus assuring rapid and complete reaction.

It is well known that when phosphate rock is intimately mixed with certain reagents, such as silica, and heated to a high temperature, preferably about 1400° C. in the presence of water vapor, the fluorine will be liberated from the rock, and if the reaction proceeds to completion, and the product is rapidly cooled, substantially all of the $P_2O_5$ in the rock will be made citrate soluble. By my method and apparatus, I can much more rapidly, completely and economically carry on the operation of calcining phosphate-bearing materials than by other methods heretofore used.

Since fluorine is a very poisonous and destructive gas, it is desirable, and in some cases commercially necessary, that means be provided to collect the released fluorine. I, therefore, provide means for collecting the fluorine, which may be present in sufficient quantities to be a valuable by-product.

An embodiment of the invention is illustrated in the accompanying drawing which is a vertical sectional view of the improved furnace and apparatus.

Similar numerals refer to similar parts throughout the drawing.

The equipment comprises the shaft furnace 1 within which is located the reaction chamber 2, in which the phosphate-bearing material is preheated, calcined, and cooled. The upper part of this chamber is the preheating section in which not only is the phosphate-bearing material preheated, but also the reaction between the silica or other reagent, and the fluorine may take place, forming silicon tetrafluoride or another fluorine compound. In the lower part of the reaction chamber 2, air for combustion, together with excess air, or water vapor, or both, is introduced and is preheated in passing upward through the falling hot calcines, the calcined material being cooled thereby; while in the central portion of reaction chamber 2, powdered coal from powdered coal bins 3, and powdered coal feeders 4, together with water vapor which may be supplied by means of steam supply line 5, is introduced into the reaction chamber 2 in such manner and amount that its combustion with air will supply sufficient heat to establish an equilibrium temperature of about 1400° C. in this zone, at which temperature the required reactions take place with the greatest rapidity.

The phosphate-bearing material in particle form to be treated may be stored in storage bin 6, the silica or other reagent in bin 7, and the powdered coal in bin 8. Phosphate-bearing material in the desired quantity fed through measuring device 9, together with silica or another reagent, if desired, fed through measuring device 10, and conveyer 11, are discharged into transport pump 12, and conveyed through transport line 13, to feeder bin 14, through feeder 15, into the top of feeding head 16, where the material descends through feeding shaft 17, through the top of reaction chamber 2, down which it falls freely in counterflow to the ascending gases, the material being heated to reaction temperature by the heat in these gases, and calcined in the central portion of the furnace; and then cooled by the incoming air for combustion, together with excess air, or water vapor, or both, which is introduced through slots in hopper 18 by means of blast fan 19, and steam supply line 19a, is preheated by this means, and ascends to the combustion zone; the cooled calcined material being collected in the bottom of hopper 20, discharged into transport pump 21, and conveyed through transport line 22 to calcined material bin 23.

Powdered coal for bins 3 may be supplied from powdered coal storage bin 8 by means of transport pump 24 and transport line 25.

The fluorine released from the phosphate-bearing material in the form of HF in the calcining zone of the furnace, ascends with the other gases to the preheating chamber where it may combine with silica or another reagent to form silicon tetrafluoride, or another fluorine compound, or in combination with silica and water vapor, hydrofluosilicic acid, and together with the other gases, passes out the top of the furnace at outlet 26 through duct 27, to absorption tower 28, in which the gases may be sprayed with water introduced through pipe 29, wherein the fluorine is removed from the other gases, allowing the $CO_2$, $H_2O$, free O, and N to escape through waste gas pipe 30 to the atmosphere. The fluorine compound collected in absorption tower 28 may be removed through outlet 31.

The reactions taking place in the calcination of phosphate rock in the presence of silica, either in the phosphate rock or separately added, and water vapor, are as follows:

(1) $3Ca_3(PO_4)_2 \cdot CaF_2$ plus $H_2O =$
$3Ca_3(PO_4)_2$ plus $CaO$ plus $2HF$ (2) $CaF_2$ plus $H_2O = CaO$ plus $2HF$ (3) $4HF$ plus $SiO_2 = SiF_4$ plus $2H_2O$ The first two reactions require a temperature of 1200° C. or higher, 1400° C. being the most favorable temperature, and the presence of excess $H_2O$ or $SiO_2$, or preferably both. The third reaction may take place substantially simultaneously with the other reactions, or may take place at a point higher in the furnace where the temperature is lower, as it does not necessarily require a high temperature.

In the calcination of phosphate rock containing

| | Per cent |
|---|---|
| $Ca_3(PO_4)_2$ | 72.8 |
| $CaF_2$ | 6.1 |
| $SiO_2$ | 8.2 | there will be required theoretically by my process to produce 2000# of available $P_2O_5$,

| | Pounds |
|---|---|
| Phosphate rock | 5998 |
| Powdered bituminous coal | 200 |
| Steam | 35 |
| Air, containing 60# $H_2O$ | 6660 | and there will be produced 5568# of calcines containing 2000# $P_2O_5$, 244# of silicon tetrafluoride or equivalent fluorine compounds, and 7081# of waste gas.

In this case 2.4% silica in the phosphate rock is sufficient theoretically to furnish the necessary silica for combining with the fluorine, and under some circumstances, there may be additional silica required to bring about the reactions in the high temperature zone of the furnace. While many natural phosphates contain sufficient silica to perform these reactions, in some phosphatic raw materials, there may be a deficiency of silica, or the silica may be so combined with the other material of the charge as to be not readily available for the reactions, in which case, additional siliceous material, or other reagent, finely ground, may be added in such quantities as may be required to insure complete calcination.

For the combustion of 200# of bituminous coal to $CO_2$ and $H_2O$, only 2100# of air are required. However, I prefer to use a large excess of air as shown by the above theoretical requirement of 6660# of air. This not only permits the recovery of substantially all of the heat in the calcined material, but on account of the large volume of gases formed by the combustion of the coal with this amount of air, the temperature may be held at approximately 1400° C. in the combustion zone and the gases hold enough sensible heat to furnish the heat required for the calcination reaction and to heat the charge to reaction temperature. This same purpose may be accomplished by substituting water vapor for a large part of the excess air. In the example shown, I have used only 100% excess water vapor over that theoretically required for the calcination reactions. However, under certain conditions it may be desirable to greatly increase this amount.

Under some conditions of operation it may be desirable to cool the calcined material in an atmosphere substantially free from moisture, in which case, the air introduced at the bottom of the furnace is treated so as to have a low moisture content, and the steam or moisture required in the calcination zone is introduced into the furnace at or near the combustion zone.

While I have described somewhat in detail a method and apparatus for carrying out my invention, I do not wish to be limited to the specific requirements outlined herein, but variations may be made to meet the requirements of specific conditions without departing from the general principles described herein.

In some cases, I prefer to obtain part of the water vapor by means of the hydrogen in the fuel burning to $H_2O$, and then I prefer bituminous coal, or a hydrocarbon liquid or gas fuel. Such water vapor as may be required by the process in addition to that resulting from the combustion of the fuel may be supplied by the use of moist or undried feed, or feed with natural moisture content, or may be conveniently supplied by steam introduced either in the combustion zone; or it may be supplied with the air for combustion admitted in the lower part of the furnace, or introduced in the form of steam or water vapor directly into the lower part of the shaft, in either of which cases, it will assist in cooling the calcined material. These means for introducing water vapors in any amount desired, permit the use of any convenient fuel.

It will be understood that the materials of the charge will be of such particle size that in falling freely through the shaft of the furnace in counterflow to the gases of combustion and reaction, sufficient time will elapse for the particles of the charge to react. It is desirable, also, to introduce a sufficient quantity of air, or air and H2O, at the bottom of the furnace to recover substantially all of the heat in the calcined material, thus rapidly cooling the calcined material. Such excess air, or air and H2O, enables a sufficient quantity of gases to be maintained when using the small amount of fuel normally required by the process, to preheat the raw material by the sensible heat in the gases without having an excessive temperature in the combustion zone. It is thus evident that the conditions required for maximum economy of fuel and efficient heating and cooling, which at the same time are the most favorable for performing the calcination reactions, may be constantly maintained by my process and apparatus.

It is thus to be noted that I have provided a simple and inexpensive method for the removal and recovery of fluorine from phosphate-bearing materials, not only putting the phosphoric acid in available form for direct application to the soil as fertilizer, but also providing a phosphatic material, free from fluorine, for further processing by any existing method, materially simplifying such further processing methods by the elimination of the difficulties now experienced in these processes by the presence of fluorine.

The product may also be used in the manufacture of stock feed or in the production of food products.

I claim:

1. The method of calcining phosphate-bearing material to eliminate the fluorine therefrom, without liberating phosphorus, which comprises contacting freely falling particles of said material with water vapor at temperatures and under conditions which effect completion of the fluorine freeing reaction while the particles are in suspension.

2. The method of calcining phosphate-bearing material to eliminate the fluorine therefrom, without liberating phosphorus, which comprises contacting freely falling particles of said material with water vapor at a temperature of approximately 1400° C. and under conditions which effect completion of the fluorine freeing reaction while the particles are in suspension.

3. The method of calcining phosphate-bearing material to eliminate the fluorine therefrom, without liberating phosphorus, which comprises contacting a charge of such material, mixed with silica, in the form of freely falling particles with water vapor at temperatures and under conditions which effect completion of the fluorine freeing reaction while the particles are in suspension.

4. The method of calcining phosphate-bearing material to eliminate the fluorine therefrom, without liberating phosphorus, which comprises contacting a charge of such material, mixed with silica, in the form of freely falling particles with water vapor at a temperature of approximately 1400° C. and under conditions which effect completion of the fluorine freeing reaction while the particles are in suspension.

5. The method of calcining phosphate-bearing material to eliminate fluorine therefrom, without liberating phosphorus, which consists in causing freely falling particles of said material to pass in counterflow through ascending heated reaction gases containing water vapor at temperatures and under conditions which effect the fluorine freeing reaction while the particles are in suspension.

6. The method of calcining phosphate-bearing material to eliminate fluorine therefrom, without liberating phosphorus, which comprises contacting freely falling particles of said material with heated reaction gases containing water vapor at temperatures and under conditions which effect the fluorine freeing reaction while the particles are in suspension, and cooling the calcined material in dry gases just before the conclusion of the free movement of the particles.

7. The method of calcining phosphate-bearing material to eliminate fluorine therefrom, without liberating phosphorus, which comprises contacting freely falling particles of said material with heated reaction gases containing water vapor at temperatures and under conditions which effect the fluorine freeing reaction while the particles are in suspension, and maintaining said gases at maximum temperature at a point intermediate the start and conclusion of the free falling movement of the particles.

8. The method of calcining phosphate-bearing material to eliminate fluorine therefrom, without liberating phosphorus, which comprises contacting freely falling particles of said material with heated reaction gases containing water vapor at temperatures and under conditions which effect the fluorine freeing reaction while the particles are in suspension, and maintaining said gases at maximum temperature by the burning of fuel at a point intermediate the start and conclusion of the free falling movement of the particles.

9. The method of calcining phosphate-bearing material to eliminate fluorine therefrom, without liberating phosphorus, which comprises contacting freely falling particles of said material with heated reaction gases at temperatures and under conditions which effect the fluorine freeing reaction while the particles are in suspension, cooling the calcined particles of the charge by cold air for combustion introduced at a point adjacent to the conclusion of the free falling movement of the particles, and collecting the calcined material.

10. The method of calcining phosphate-bearing material to eliminate fluorine therefrom, without liberating phosphorus, which comprises contacting freely falling particles of said material with water vapor at temperatures and under conditions which effect the fluorine freeing reaction while the particles are in suspension, recovering substantially all the heat in the calcined material and utilizing such heat in preheating the incoming charge.

THADDEUS F. BAILY.